(12) United States Patent
Lenk et al.

(10) Patent No.: US 8,754,594 B2
(45) Date of Patent: Jun. 17, 2014

(54) THERMAL PROTECTION CIRCUIT FOR AN LED BULB

(71) Applicant: Switch Bulb Company, Inc., San Jose, CA (US)

(72) Inventors: Ronald J. Lenk, Woodstock, GA (US); John D. Grainger, Fremont, CA (US)

(73) Assignee: Switch Bulb Company, Inc., San Jose, CA (US)

( * ) Notice: Subject to any disclaimer, the term of this patent is extended or adjusted under 35 U.S.C. 154(b) by 0 days.

(21) Appl. No.: 13/647,324

(22) Filed: Oct. 8, 2012

(65) Prior Publication Data

US 2013/0033179 A1 Feb. 7, 2013

Related U.S. Application Data

(63) Continuation of application No. 13/155,361, filed on Jun. 7, 2011, now Pat. No. 8,283,877.

(51) Int. Cl.
*H05B 37/02* (2006.01)

(52) U.S. Cl.
USPC .......................... 315/311; 315/291; 315/308

(58) Field of Classification Search
USPC ......... 315/291, 307–308, 311, 294, 297, 300, 315/302; 361/93.8, 106; 362/650
See application file for complete search history.

(56) References Cited

U.S. PATENT DOCUMENTS

| | | | |
|---|---|---|---|
| 5,939,839 A * | 8/1999 | Robel et al. .................... 315/289 |
| 6,111,739 A * | 8/2000 | Wu et al. ........................ 361/106 |
| 6,693,394 B1 | 2/2004 | Guo et al. |
| 7,558,084 B2 | 7/2009 | Jang |
| 7,812,550 B2 * | 10/2010 | Harmgardt et al. ........... 315/291 |
| 7,872,527 B2 | 1/2011 | Smith |
| 7,946,730 B2 | 5/2011 | Catalano et al. |
| 7,948,190 B2 | 5/2011 | Grajcar |
| 7,986,112 B2 * | 7/2011 | West ............................. 315/309 |
| 8,174,811 B2 * | 5/2012 | Hasunuma et al. ........... 361/106 |
| 2008/0224634 A1 * | 9/2008 | Scilia ............................ 315/294 |

(Continued)

OTHER PUBLICATIONS

International Search Report and Written Opinion received for PCT Patent Application No. PCT/US2012/041420, mailed on Aug. 10, 2012, 9 pages.

(Continued)

*Primary Examiner* — Douglas W Owens
*Assistant Examiner* — Henry Luong
(74) *Attorney, Agent, or Firm* — Morrison & Foerster LLP

(57) ABSTRACT

A light-emitting diode (LED) bulb has an LED within a shell. The LED bulb includes a driver circuit for providing current to the LED. The drive circuit has a thermal protection circuit, which includes a first positive thermal coefficient thermistor with a first switching temperature connected in series with a second positive thermal coefficient thermistor with a second switching temperature. The driver circuit includes a switch-mode power supply (SMPS) controller with an input pin and an output pin. The thermistors are connected to the input pin. When either thermistor temperature is above the respective switching temperatures, the thermal protection circuit causes the SMPS controller to produce a signal with a second duty cycle on the output pin. When both thermistor temperatures are below the respective switching temperatures, the thermal protection circuit causes the SMPS controller to produce a signal with a first duty cycle on the output pin.

25 Claims, 8 Drawing Sheets

(56) References Cited

U.S. PATENT DOCUMENTS

| | | | |
|---|---|---|---|
| 2009/0195186 A1 | 8/2009 | Guest et al. | |
| 2009/0295292 A1 | 12/2009 | Harmgardt et al. | |
| 2010/0033113 A1 | 2/2010 | Maruyama et al. | |
| 2010/0134024 A1 | 6/2010 | Brandes | |
| 2011/0037387 A1* | 2/2011 | Chou et al. | 315/35 |
| 2011/0109229 A1 | 5/2011 | Akins | |
| 2011/0121727 A1 | 5/2011 | Sharrah et al. | |
| 2012/0212129 A9* | 8/2012 | Chou et al. | 315/35 |

OTHER PUBLICATIONS

Non Final Office Action received for U.S. Appl. No. 13/155,361, mailed on Feb. 3, 2012, 16 pages.

Notice of Allowance received for U.S. Appl. No. 13/155,361, mailed on Jun. 11, 2012, 8 pages.

Notice of Allowance received for U.S. Appl. No. 13/155,361, mailed on Jun. 22, 2012, 6 pages.

International Preliminary Report on Patentability received for PCT Patent Application No. PCT/US2012/041420, mailed on Dec. 27, 2013, 7 pages.

* cited by examiner

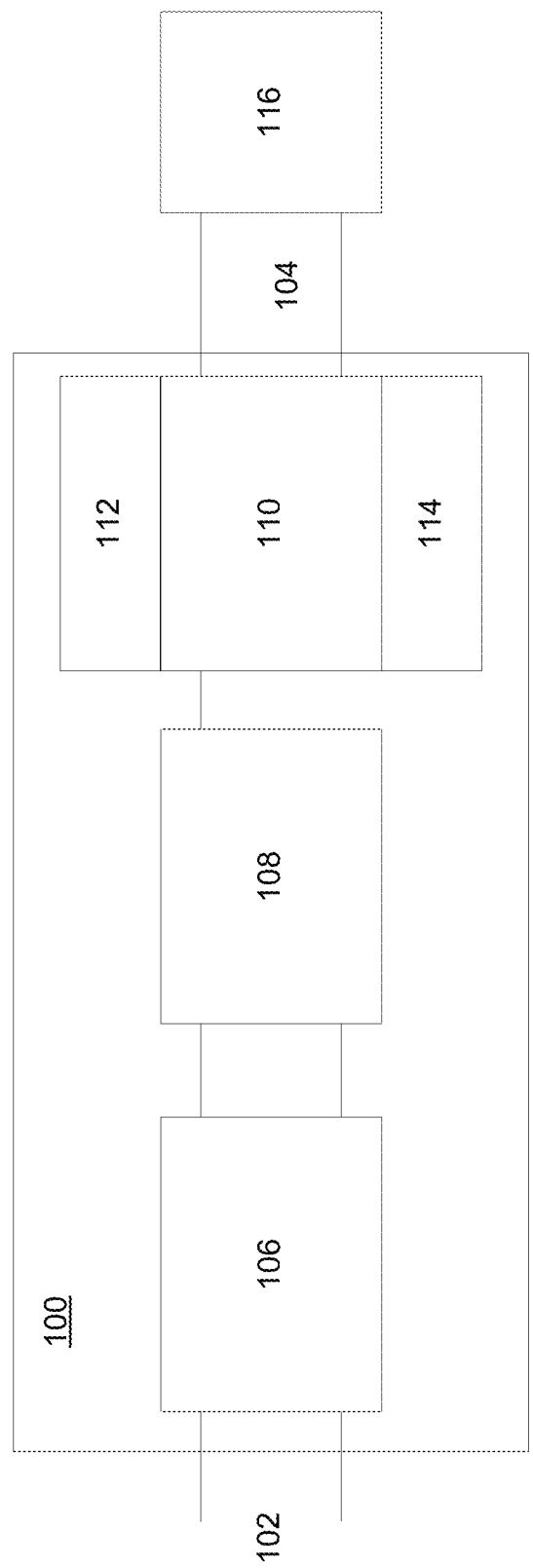

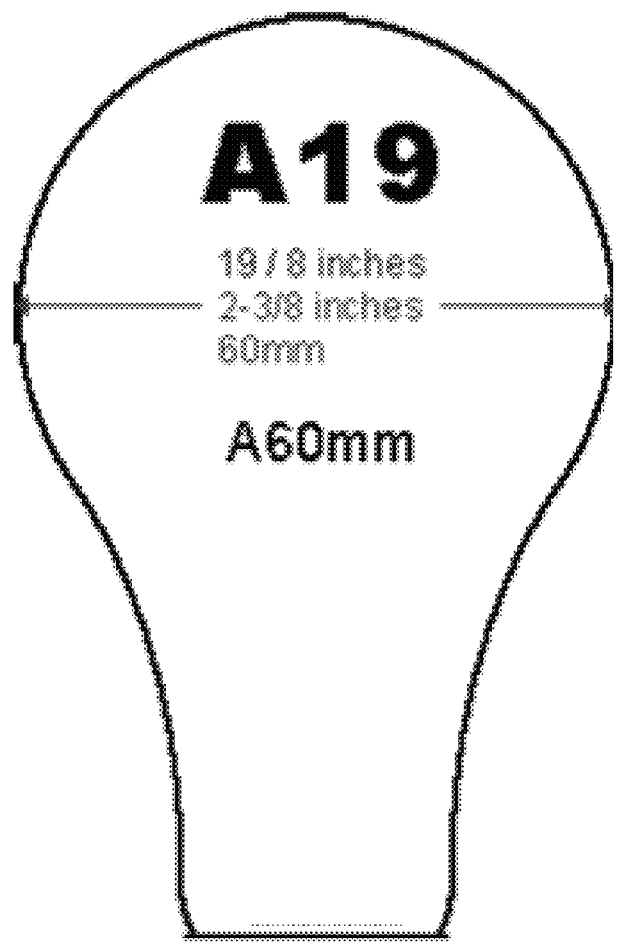
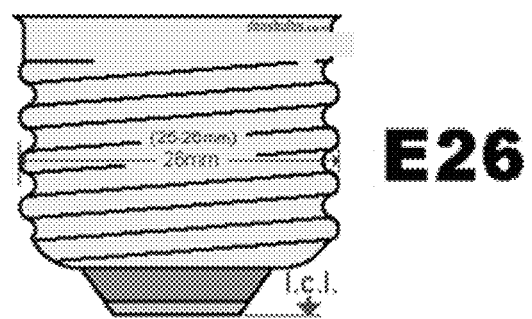
Fig. 3

US 8,754,594 B2

THERMAL PROTECTION CIRCUIT FOR AN LED BULB

CROSS-REFERENCE TO RELATED APPLICATIONS

The present application is a Continuation of U.S. application Ser. No. 13/155,361, filed on Jun. 7, 2011, issued as U.S. Pat. No. 8,283,877 on Oct. 9, 2012, which is hereby incorporated by reference in its entirety for all purposes.

BACKGROUND

1. Field

The present disclosure generally relates to a driver circuit for light-emitting diode (LED) bulbs, and, more particularly, to a driver circuit with thermal protection circuitry for preventing damage to an LED bulb that may result from overheating.

2. Description of the Related Art

High temperatures may reduce the operating life of an LED bulb. The LEDs, the driver circuitry, and the cooling system may all be sensitive to heat build-up in the LED bulb. Failure in any one of these components may result in failure of the LED bulb.

The operating temperature of an LED bulb depends on many factors. For example, each individual LED produces heat. Therefore, the number and type of LEDs present in the bulb may affect the amount of heat the LED bulb produces. Additionally, drive circuitry may also produce significant amounts of heat.

Other factors may determine the rate at which generated heat is dissipated. For example, the nature of the enclosure into which the LED bulb is installed may dictate the orientation of the LED bulb, the insulating properties surrounding the LED bulb, and the direction of the convective air stream flowing over the LED bulb. Each of these factors may have a dramatic effect on the build-up of heat in and around the LED bulb.

Accordingly, it may be desirable to dim or turn off the LEDs when the LED bulb or portions of the LED bulb reach certain temperatures. However, the additional circuitry required for this task must fit, along with the other required components, within the limited form factor of the LED bulb.

In the United States, a common lamp bulb form factor is the A19 bulb with the E26 connector, as shown in FIG. 3. LED bulbs must often fit all required components, including the driver circuit, heat sinks, and LEDs, within the A19 bulb and E26 connector. As such, the size and weight of the driver circuit is a significant design consideration because of the limited volume available in the A19 bulb and E26 connector enclosures. LED bulbs meant as replacements for common lamp bulbs in other countries are also limited to comparable volumes.

The limited space in LED bulbs with common bulb form factors prohibits the use of a conventional thermal protection circuit used in microelectronics. This type of circuit usually includes a temperature sensing device, an amplifier, and a switch to turn off the power to the LED bulb. However, the addition of these components to the LED bulb is difficult due to the limited space of common bulb form factors.

SUMMARY

A first embodiment of a light-emitting diode (LED) bulb has an LED within a shell. The LED bulb also includes a driver circuit for providing current to the LED. The drives circuit has a thermal protection circuit. The driver circuit includes a first thermistor in series with a second thermistor. The first thermistor has a positive thermal coefficient and a first switching temperature. The second thermistor has a positive thermal coefficient and a second switching temperature. The driver circuit also includes a switch-mode power supply (SMPS) controller with an input pin and an output pin. The thermistors are connected to the input pin. When the first thermistor is at a first operating temperature above the first switching temperature, the thermal protection circuit causes the SMPS controller to produce a signal with a first duty cycle on the output pin. When the second thermistor is at a second operating temperature above the second switching temperature, the thermal protection circuit causes the SMPS controller to produce a signal with the first duty cycle on the output pin. When the first thermistor is at a third operating temperature below the first switching temperature and the second thermistor is at a fourth operating temperature below the second switching temperature, the SMPS controller produces a signal with a second duty cycle on the output pin.

A first embodiment of a driver circuit provides current to an LED. The drive circuit has a thermal protection circuit, which includes a first thermistor and a second thermistor. The first thermistor has a positive thermal coefficient and a first switching temperature. The second thermistor has a positive thermal coefficient and a second switching temperature. The driver circuit includes a switch-mode power supply (SMPS) controller with an input pin and an output pin. The thermistors are connected to the input pin. When the first thermistor is at a first operating temperature above the first switching temperature, the thermal protection circuit causes the SMPS controller to produce a signal with a first duty cycle on the output pin. When the second thermistor is at a second operating temperature above the second switching temperature, the thermal protection circuit causes the SMPS controller to produce a signal with the first duty cycle on the output pin. When the first thermistor is at a third operating temperature below the first switching temperature and the second thermistor is at a fourth operating temperature below the second switching temperature, the thermal protection circuit causes the SMPS controller to produce a signal with a second duty cycle on the output pin.

DESCRIPTION OF THE FIGURES

FIG. 1 depicts a block level schematic of an exemplary driver circuit with a thermal protection circuit.

FIG. 3 depicts an A19 bulb/shell and E26 connector found in a common light bulb form factor.

DETAILED DESCRIPTION

Figure 2A:
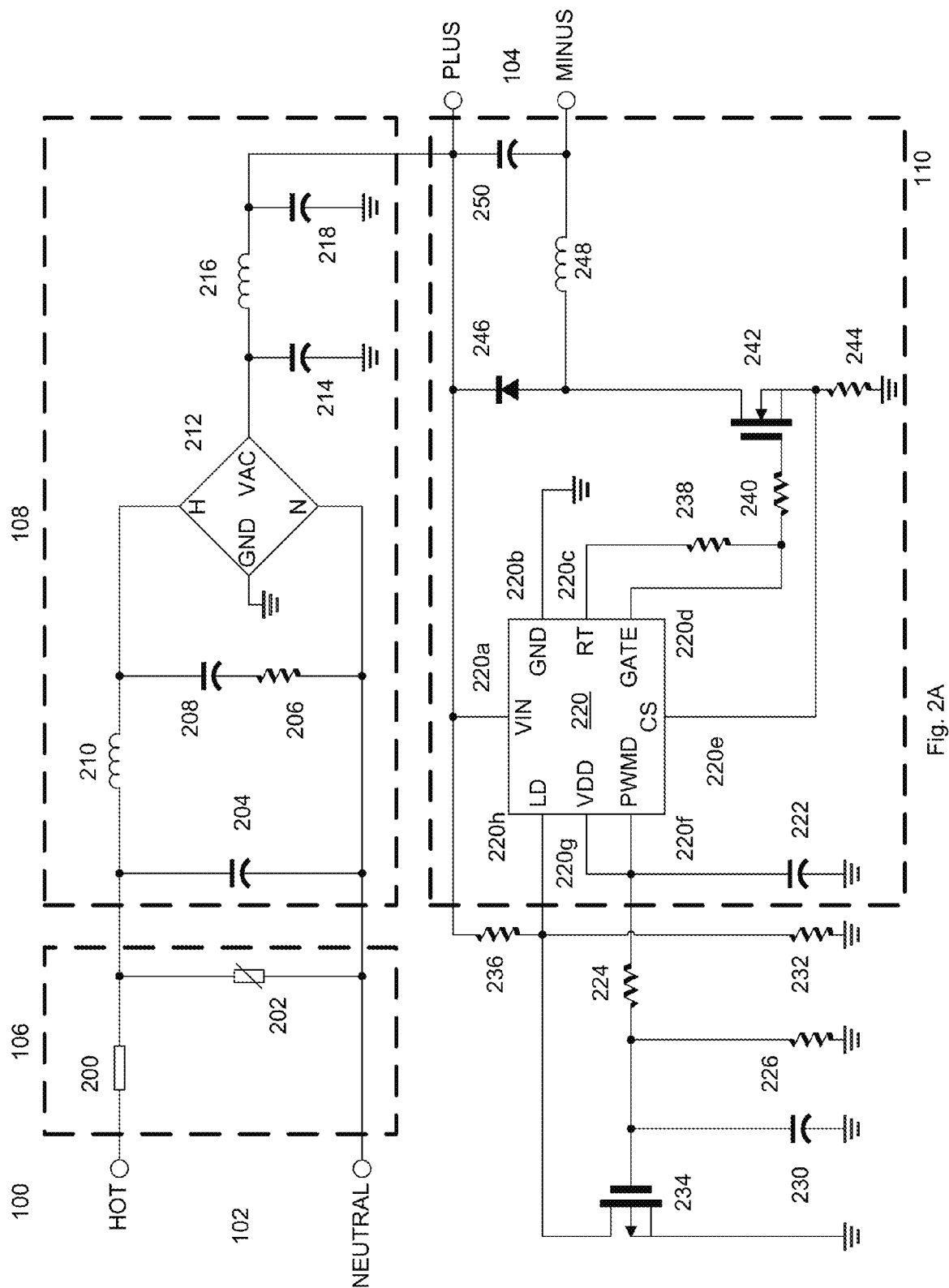
FIGS. 2A and 2B depict a component level schematic of the exemplary driver circuit with the thermal protection circuit.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

FIG. 1 depicts a functional level diagram of exemplary driver circuit 100 utilizing a thermal shutdown circuit. Driver circuit 100 may be used in an LED bulb to power one or more LEDs 116. As an input, driver circuit 100 takes an input line voltage (e.g., 120V AC, 60 Hz in the U.S.) at input 102. As an output, driver circuit 100 produces an output current suitable for powering LEDs 116 connected to output 104.

As will be described in more detail below, driver circuit 100 includes input protection circuit 106, input filter circuit 108, switched mode power supply (SMPS) circuit 110, thermal protection circuit 112, and power factor control circuit 114. Input protection circuit 106 is configured to protect driver circuit 100 and LEDs 116 from damage due to voltage spikes in the input line voltage or to prevent electrical shorts in the LED bulb from damaging the surrounding environment. Input protection circuit 106 is configured to also limit the input current when a switched voltage is first applied to input 102. Input filter circuit 108 is configured to condition the input line voltage for use with SMPS circuit 110, and to prevent noise generated by SMPS circuit 110 from reaching input 102 and affecting other devices connected to the input line voltage. SMPS circuit 110 is configured to convert the input line voltage to a current that is suitable for driving one or more LEDs 116. Thermal shutdown circuit 112 is configured to reduce or eliminate the current being supplied to LEDs 116 in the event that drive circuit 100, LEDs 116, or some other part of the LED bulb reaches a threshold temperature. Power factor control circuit 114 is configured to adjust the current that SMPS circuit 110 supplies to LEDs 116.

It should be recognized that some of the circuit blocks shown in FIG. 1 may be omitted. For example, if an LED bulb naturally operates in its most efficient state, then power factor control circuit 114 may not be necessary. Alternatively, the input protection may take place outside of the LED bulb, and therefore, input protection circuit 106 may not be necessary.

Figure 2B:
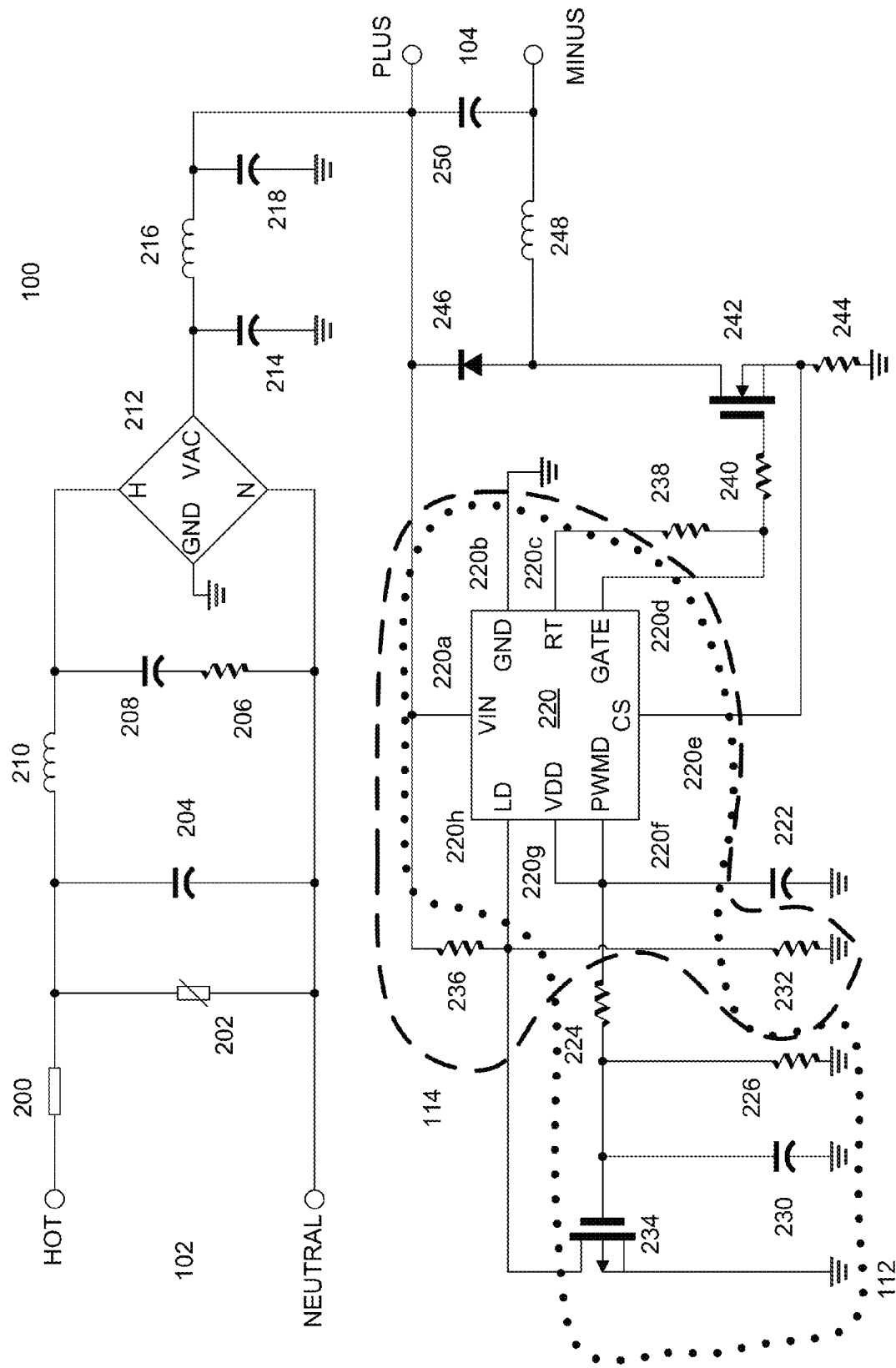

FIGS. 2A and 2B depict a component level schematic of driver circuit 100. The discussion below of the component level schematic lists several ranges, specific values, and part IDs for various components. It should be understood that these are not intended to be limiting. Other components values, parts, and ranges may also be used without deviating from a driver circuit using a thermal protection circuit as described herein. Additionally, while a specific circuit topology is presented in FIGS. 2A and 2B, a person skilled in the art will recognize that other topologies could be used without deviating from a driver circuit using a thermal protection circuit as described herein.

Referring to FIG. 2A, SMPS circuit 110 includes: SMPS controller 220; switching element 242; resistors 238, 240, and 244; diode 246; inductor 248; and capacitor 250. SMPS controller 220 drives the switching speed and duty cycle of switching element 242, which controls the amount of current provided to the LEDs connected between output 104. Pins 220a-220h are input and output pins of SMS controller 220. In one example, SMPS controller 220 is implemented with an HV9910B controller made by Supertex Inc. If using the HV9910B IC or a similar controller, SMPS controller 220 may operate in either constant off-time or constant frequency mode.

In constant frequency mode (set by connecting resistor 238 between RT pin 220c and ground, the frequency of the output at GATE pin 220d is set by the value of resistor 238. The duty cycle of the output may then be set by resistor 244.

In constant off-time mode (set by connecting RT pin 220c to GATE pin 220d as shown in FIG. 2A), the duty cycle of the output at GATE pin 220d of SMPS controller 220 is set based on the value of resistor 238. The frequency of the output can then be varied with resistor 244. As shown in FIG. 2A, SMPS controller 220 is set for constant off-time mode because RT pin 220c is connected to GATE pin 220d through resistor 238.

The values of the components in SMPS circuit 110 may be selected to provide suitable current to the LEDs connected to output 104, based on, among other factors, the input line voltage, the voltage drop across the LEDs, and the current required to drive the LEDs. For example, resistor 238 may be 300 kΩ, resistor 240 may be 20Ω, resistor 244 may be 180 mΩ. Capacitor 222 is a hold-up capacitor to maintain VDD during switching, and may be 1 uF. Switching element 242 may be selected to operate properly with the operating range of SMPS controller 220 and to provide sufficient current for the LEDs. Switching element 242 may be an IRFR320PBF HEXFET Power MOSFET from International Rectifier. Diode 246 provides a current path for the current stored in inductor 248 to be supplied to the LEDs when switching element 242 is turned off. Diode 246 may be a IDD03SG60C SiC Schottky diode from Infineon Technologies. Capacitor 250 may filter the high frequency noise generated by the capacitance of the windings of inductor 248. Capacitor 250 may be 22 nF. Inductor 248 stores energy to supply current to LEDs connected to output 104 while switching element 242 is switched off. Inductor 248 may be an inductor of about 100 turns of 24 gauge, triple-insulated wire wound around a Magnetics CO55118A2 toroid core.

Referring to FIG. 2B, thermal protection circuit 112 includes transistor 234, thermistor 226, and resistor 224. Thermal protection circuit 112 also uses SMPS controller 220. Transistor 234 may be a BSS123 Power n-channel MOSFET from Weitron Technology. Resistor 224 is a pull-up resistor to ensure that the gate of transistor 234 does not float when thermistor 226 has a high resistance (discussed below). Resistor 224 may be 100 kΩ.

Figure 4:
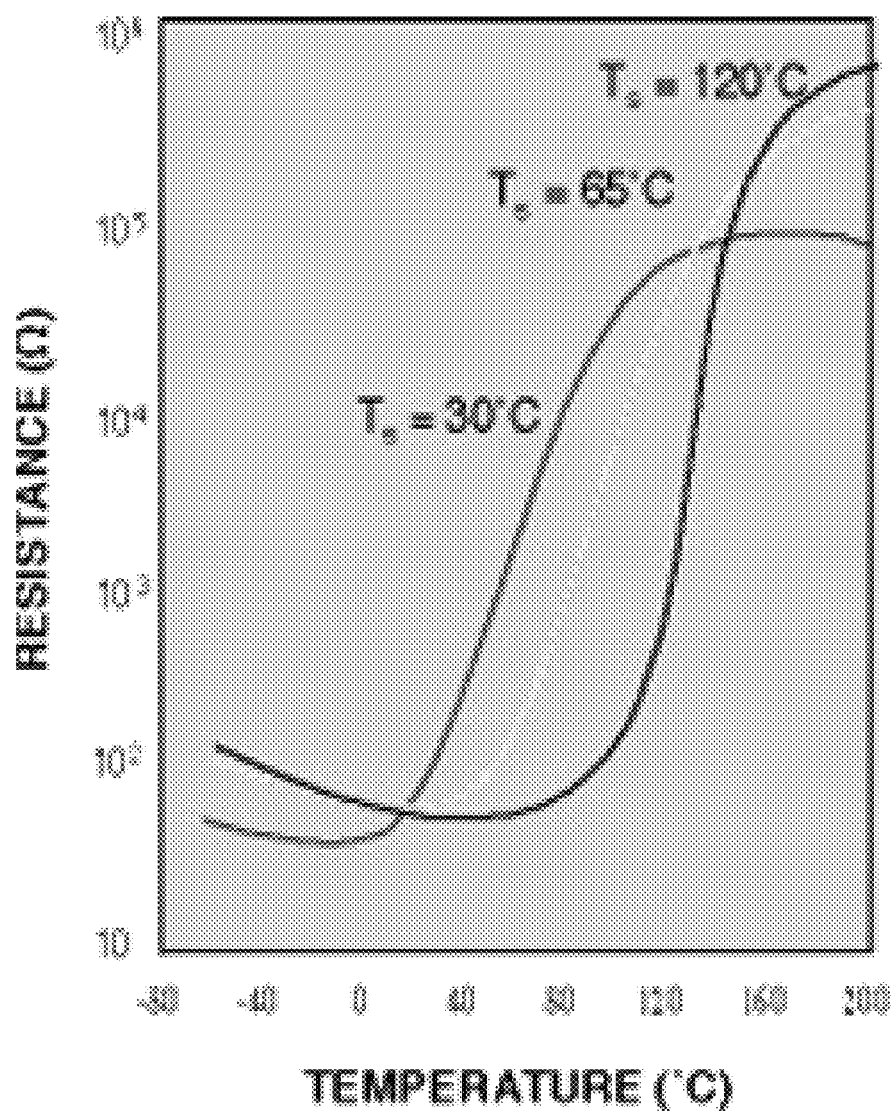
FIG. 4 depicts the behavior of thermistors in response to temperature.

In the present exemplary embodiment, thermistor 226 may be implemented as a positive temperature coefficient (PTC) thermistor. A PTC thermistor behaves as a normal small value resistor at nominal operating temperatures (i.e., the resistance changes slowly as temperature changes). However, once the operating temperature passes a switching temperature (Ts), the resistance of the PTC thermistor increases rapidly with increasing temperature. This effect is depicted by the resistance versus temperature curves for three PTC thermistors in FIG. 4.

The switching temperature may be selected depending on the recommended operating temperature for the LED bulb. For example, in the present exemplary embodiment, a PTC thermistor with a switching temperature of about 100° C. may be appropriate. Alternatively, lower or higher switching temperatures may be desirable depending on the recommended operating temperature for the component that is being monitored. For example, the driver circuit of an LED bulb may be able to operate at a higher temperature than the LEDs. Therefore, a thermistor near the driver circuit may have a higher switching temperature than a thermistor on heat sinks attached to the LEDs.

Figure 7:
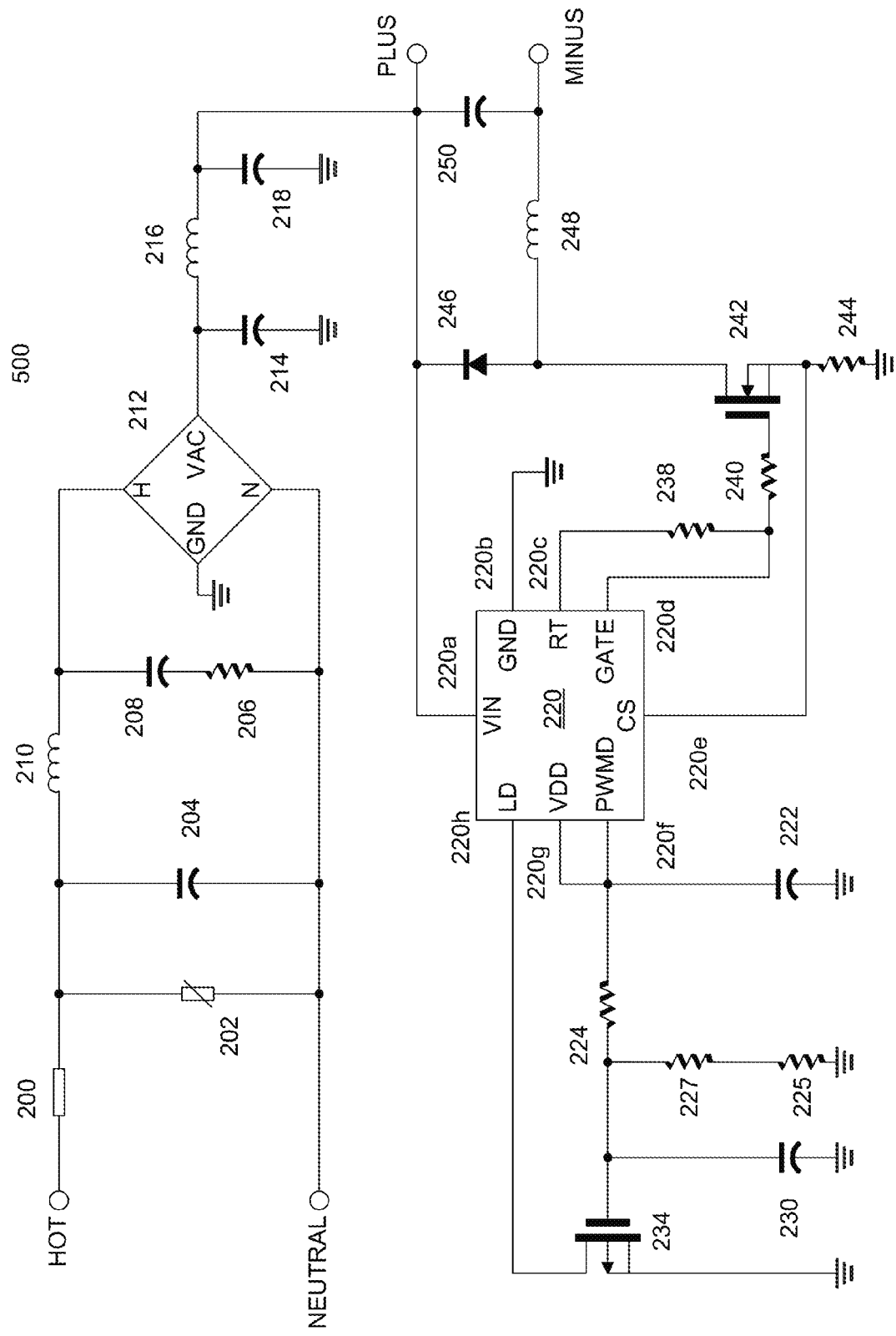
FIG. 7 depicts an alternative exemplary driver circuit using two thermistors.

Two or more thermistors may also be used to monitor multiple locations in the LED light bulb. For example, in FIG. 7 thermistor 227 with a switching temperature of 120° C. may be placed on the driver circuit and thermistor 225 with a switching temperature of 90° C. may be placed on the LED heat sink. If the two thermistors are connected in series, then while the driver circuit stays below 120° C. and the heat sink stays below 90° C., the series resistance of the two thermistors will remain low. However, if the driver circuit temperature rises above 120° C. or the heat sink temperature rises above 90° C., then the series resistance of the two thermistors will increase exponentially.

While thermal protection circuit 112 of driver circuit 100 uses a PTC thermistor, other temperature-sensitive components may also be used. For example, a negative temperature coefficient thermistor or a temperature-sensitive diode could be used if the topology of thermal protection circuit 112 is modified to modulate SMPS controller 220's switching characteristics in a similar manner as described below.

Thermal protection circuit 112 makes use of linear dimmer (LD) pin 220*h* of SMPS controller 220. The voltage applied to LD pin 220*h* may change the timing of the output signal on GATE pin 220*d*, which in turn changes the timing of switching element 242. As the voltage on LD pin 220*h* is lowered, the duty cycle (if in constant off-time mode) of the output signal is decreased, which causes switching element 242 to stay in the off-state for a longer portion of each switching cycle. The longer that switching element 242 is off during each switching cycle, the less current that is delivered to the LEDs that are connected across output 104, which causes the output of the LEDs to dim. If a zero voltage is applied to LD pin 220*h*, the duty cycle will drop to zero and no current will be delivered to output 104 and any connected LEDs will be turned off.

In a different implementation of SMPS controller 220, LD pin 220*h* starts to reduce the duty cycle of switching element 242 only when the voltage applied to LD pin 220*h* drops below a threshold value. In this example, changes in the voltage applied to LD pin 220*h* will not affect the duty cycle of switching element 242 if the voltage at LD pin 220*h* remains above the threshold value. However, if the voltage applied to LD pin 220*h* drops below the threshold value, then SMPS controller 220 will reduce the duty cycle as discussed in the previous paragraph.

In the above explanation of the operation of LD pin 220*h* to reduce the driver circuit output current and dim the LEDs, SMPS controller 220 was assumed to be in constant off-time mode. If SMPS controller 220 is instead in constant frequency mode, then LD pin 220*h* will operate in a similar fashion, except instead of modulating the duty cycle of the output signal, the frequency of the output signal will change.

Referring back to exemplary driver circuit 100 of FIGS. 2A and 2B, at operating temperatures below the recommended operating temperature, thermistor 226 is a low-value resistor, which holds the gate terminal of transistor 234 low. With transistor 234 turned off, SMPS controller 220 internally pulls LD pin 220*h* high. Thus, the low resistance of thermistor 226 causes GATE pin 220*d* to drive switching element 214 at the nominal duty cycle.

However, as the operating temperature of the LED bulb increases, thermistor 226 becomes a high-value resistor, which turns on transistor 234 as the gate terminal is biased through resistor 224 by VDD pin 220*g* of SMPS controller 220. As transistor 234 turns on, it pulls LD pin 220*h* lower. Once transistor 234 pulls LD pin 220*h* below some threshold value, further decreases in the voltage on LD pin 220*h* will cause SMPS controller 220 to reduce the duty cycle (if SMPS controller 220 is configured for constant off-time mode) on GATE pin 220*d*, which in turn reduces the duty cycle of switching element 242. Thus, the high resistance of thermistor 226 causes switching element 242 to operate at a duty cycle smaller than the nominal duty cycle.

The less time that switching element 242 is in the on-state, the less current that is delivered to output 104 and the output light of the LED bulb decreases. As the current provided by the driver circuit decreases and the output light of the LED bulb decreases, the operating temperature decreases as well.

Optionally, a filter in the form of capacitor 222 may be connected to the gate of transistor 234 to provide a time lag for the biasing of LD pin 220*h* by transistor 234. The time lag may prevent the system from unstable or erratic behavior caused by small variations in the voltage on LD pin 220*h*. Capacitor 222 may be 4.7 uF.

Referring back to FIG. 2A, input protection circuit 106 includes fuse 200 that protects against short circuits in the rest of the driver circuit or LEDs and varistor 202 that protects against voltage spikes in the input line voltage. For example, fuse 200 may be a 250 mA slow blow micro fuse and varistor may be a 240V-rated metal oxide varistor.

Input filter circuit 108 includes: capacitors 204, 210, 214, and 218; inductors 208 and 216; resistor 206; and bridge rectifier 212. Components for input filter circuit 108 should be selected to properly condition the input line voltage for use with SMPS circuit 110 and to prevent noise from SMPS circuit 110 from reaching input 102 and affecting other devices connected to the input line.

For example, if driver circuit 100 is connected to a 120V AC, 60 Hz input line voltage, bridge rectifier 212 may be a 400V diode bridge rectifier. Capacitor 204 may be selected to suppress high frequencies generated by SMPS circuit 110 and may be 2.2 nF. Inductors 208 and 216 may be 1-2 mH inductors or more specifically, about 200 turns of 36 gauge wires wound around a Magnetics CO58028A2 toroid core. The damping network of resistor 210 and capacitor 206 may help minimize ringing of driver circuit 100 when input 102 is connected to the input line voltage through a residential dimmer. Resistor 210 may be 120Ω and capacitor 206 may be 680 nf. Filter capacitors 214 and 218 may be 100 nF.

Referring again to FIG. 2B, power factor control circuit 114 may include resistors 232 and 236, which feed a signal representative of the current being supplied to LEDs connected to output 104. Based on this signal, SMPS controller 220 may adjust the timing of switching element 242, which modifies the current being supplied to output 104. Resistors 232 and 236 may be 1.5 kΩ and 1 MΩ, respectively.

Figure 5:
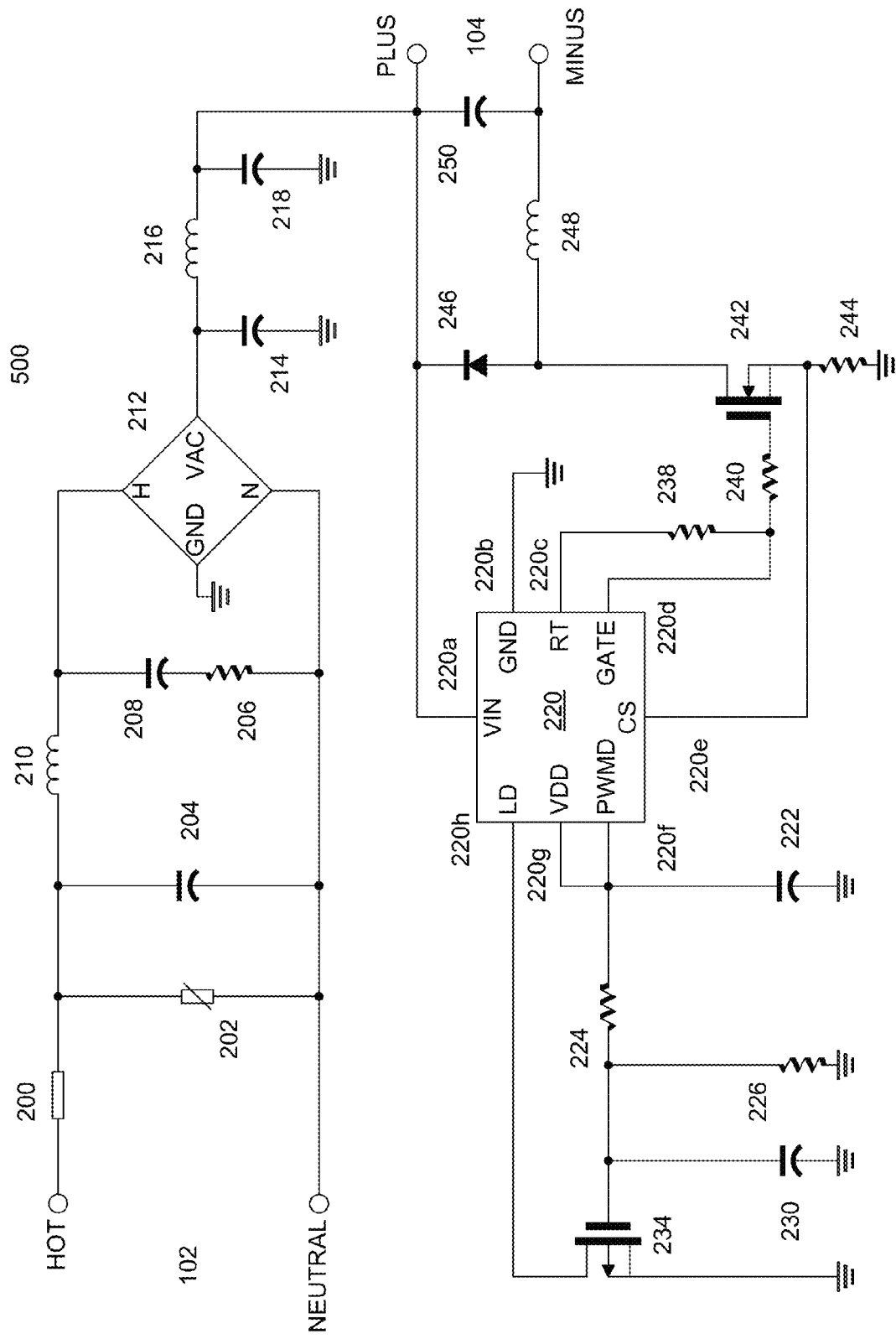
FIG. 5 depicts an alternative exemplary driver circuit.

FIG. 5 depicts alternative exemplary driver circuit 500. Driver circuit 500 is similar to driver 100 (FIG. 1) except driver circuit 500 does not include power factor control circuit 114 (FIG. 2B) or capacitor 222 (FIG. 2B) of temperature protection circuit 112 (FIG. 2B).

Figure 6:
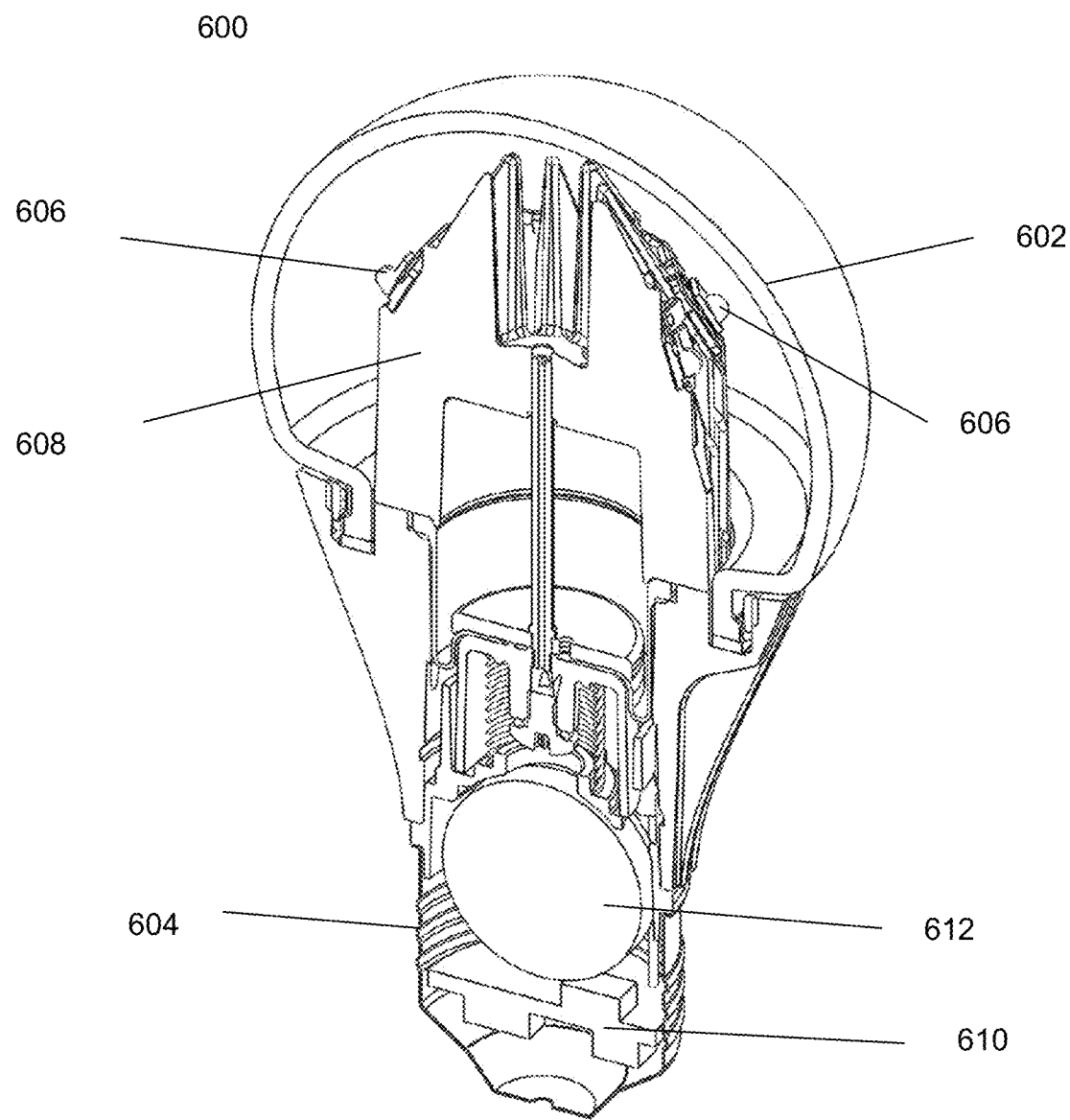
FIG. 6 depicts an exemplary LED bulb with the exemplary driver circuit with the thermal protection circuit.

FIG. 6 depicts an exemplary LED bulb 600 with shell 602 and base 604. The LED bulb contains LEDs 606, heat sink 608, and driver circuit 610. In exemplary LED bulb 600, driver circuit 610 may be the driver circuit discussed above with respect to FIGS. 2A and 2B and is substantially contained within 604 base. In this context, substantially contained means that the majority of the driver circuit is within base 604 but parts of the driver circuit components may be protruding from base 604. For example, the top part of inductor 612 may protrude above base 604 into heat sink 608 or shell 602 if the shell is connected directly to base 604. Additionally, substantially contained also means that one or more thermistors or other temperature-sensitive components may be located outside of base 604 if temperatures at locations other than drive circuit 610 are to be monitored. For example, one thermistor may be located on driver circuit 610 in base 604, while a second thermistor may be located on heat sink 608 or within shell 602. In this example, driver circuit 610 is still substantially contained in base 604.

Although a feature may appear to be described in connection with a particular embodiment, one skilled in the art would recognize that various features of the described embodiments may be combined. Moreover, aspects described in connection with an embodiment may stand alone.

What is claimed is:

1. A light-emitting diode (LED) bulb comprising:
   a shell;
   an LED contained within the shell;
   a heat sink for dissipating heat generated by the LED;
   a driver circuit for providing current to the LED, the driver circuit having a thermal protection circuit that comprises:
      a first thermistor configured to have a first switching temperature;
      a second thermistor configured to have a second switching temperature, wherein the second thermistor is connected in series with the first thermistor; a first resistor; a switch-mode power supply (SMPS) controller having an input pin and an output gate pin, wherein the first thermistor is connected to the input pin and the first resistor is connected to the output gate pin, wherein, when the first thermistor is at a first operating temperature above the first switching temperature, the first thermistor is configured to cause the input pin of the SMPS controller to be at or below a first voltage,
      wherein, when the second thermistor is at a second operating temperature above the second switching temperature, the second thermistor is configured to cause the input pin of the SMPS controller to be at or below the first voltage,
      wherein, when the first thermistor is at a third operating temperature below the first switching temperature and the second thermistor is at a fourth operating temperature below the second switching temperature, the first thermistor and the second thermistor are configured to cause the input pin of the SMPS controller to be at or above a second voltage, wherein the second voltage is higher than the first voltage,
      wherein, when the input pin is at or below the first voltage, the SMPS controller is configured to supply a first signal with a first duty cycle on the output gate pin, and
      wherein, when the input pin is at or above the second voltage, the SMPS controller is configured to supply a second signal with a second duty cycle on the output gate pin, and
      wherein the second duty cycle is higher than the first duty cycle; and
   a base attached to the shell for connecting the LED bulb to an electrical socket.

2. The LED bulb of claim 1, wherein the first switching temperature is different than the second switching temperature.

3. The LED bulb of claim 2, wherein the first thermistor is located adjacent to the heat sink, and wherein the second thermistor is located adjacent to the driver circuit.

4. The LED bulb of claim 3, wherein the first switching temperature is lower than the second switching temperature.

5. The LED bulb of claim 4, wherein the first thermistor is a first positive temperature coefficient thermistor and the second thermistor is a second positive temperature coefficient thermistor.

6. The LED bulb of claim 3, wherein the driver circuit substantially fits within the base.

7. The LED bulb of claim 3, wherein the thermal protection circuit further comprises:
   a MOS transistor having a gate terminal connected to the first thermistor and a drain or a source terminal connected to the input pin.

8. The LED bulb of claim 7, wherein the first switching temperature is lower than the second switching temperature.

9. The LED bulb of claim 7, wherein the thermal protection circuit further comprises:
   a filter connected to the gate terminal of the MOS transistor.

10. The LED bulb of claim 9, wherein the filter comprises a second resistor and a capacitor.

11. The LED bulb of claim 1, wherein the driver circuit further comprises:
    an input filter connected to the SMPS controller, wherein the input filter is configured to accept an alternating current (AC) input and the input filter is configured to produce a rectified output, and wherein the input filter is configured to be electrically connected to the base.

12. The LED bulb of claim 11, wherein the second switching temperature is different than the first switching temperature.

13. The LED bulb of claim 1 further comprising:
    an input filter connected to the SMPS controller, wherein the input filter is configured to accept an alternating current (AC) input and the input filter is configured to produce a rectified output.

14. The LED bulb of claim 13, wherein the first thermistor is located adjacent to the heat sink, and wherein the second thermistor is located adjacent to the driver circuit.

15. The LED bulb of claim 14, wherein the first switching temperature is lower than the second switching temperature.

16. A thermal protection circuit for a light-emitting diode (LED) bulb, the circuit comprising:
    a first thermistor configured to have a first switching temperature;
    a second thermistor configured to have a second switching temperature, wherein the second thermistor is connected in series with the first thermistor; a resistor; and a switch-mode power supply (SMPS) controller having an input pin and an output gate pin, wherein the first thermistor is connected to the input pin and the resistor is connected to the output gate pin, wherein, when the first thermistor is at a first operating temperature above the first switching temperature, the first thermistor is configured to cause the input pin of the SMPS controller to be at or below a first voltage,
    wherein, when the second thermistor is at a second operating temperature above the second switching temperature, the second thermistor is configured to cause the input pin of the SMPS controller to be at or below the first voltage,
    wherein, when the first thermistor is at a third operating temperature below the first switching temperature and the second thermistor is at a fourth operating temperature below the second switching temperature, the first thermistor and the second thermistor are configured to cause the input pin of the SMPS controller to be at or above a second voltage, wherein the second voltage is higher than the first voltage,
    wherein, when the input pin is at or below the first voltage, the SMPS controller is configured to supply a first signal with a first duty cycle on the output gate pin, and wherein, when the input pin is at or above the second voltage, the SMPS controller is configured to supply a second signal with a second duty cycle on the output gate pin, and wherein the second duty cycle is higher than the first duty cycle.

17. The circuit of claim 16, wherein the first switching temperature is different than the second switching temperature.

18. The circuit of claim 17, wherein the first thermistor is located adjacent to a heat sink, and wherein the second thermistor is located adjacent to a driver circuit.

19. The circuit of claim 18, wherein the first switching temperature is lower than the second switching temperature.

20. The circuit of claim 19, wherein the first thermistor is a first positive temperature coefficient thermistor and the second thermistor is a second positive temperature coefficient thermistor.

21. The circuit of claim 17, further comprising a MOS transistor having a gate terminal connected to the first thermistor and a drain or a source terminal connected to the input pin.

22. The circuit of claim 21, further comprising a filter connected to the gate of the MOS transistor.

23. The circuit of claim 16, further comprising a MOS transistor having a gate terminal connected to the first thermistor and a drain or a source terminal connected to the input pin.

24. The circuit of claim 23, further comprising a filter connected to the gate of the MOS transistor.

25. The circuit of claim 16, further comprising an input filter connected to the SMPS controller, wherein the input filter is configured to accept an alternating current (AC) input and the input filter is configured to produce a rectified output, and wherein the input filter is configured to be electrically connected to a base.

* * * * *